M. B. LLOYD.
MACHINE FOR FORMING AND WELDING TUBING.
APPLICATION FILED APR. 6, 1912.
1,124,759.
Patented Jan. 12, 1915.
4 SHEETS—SHEET 1.
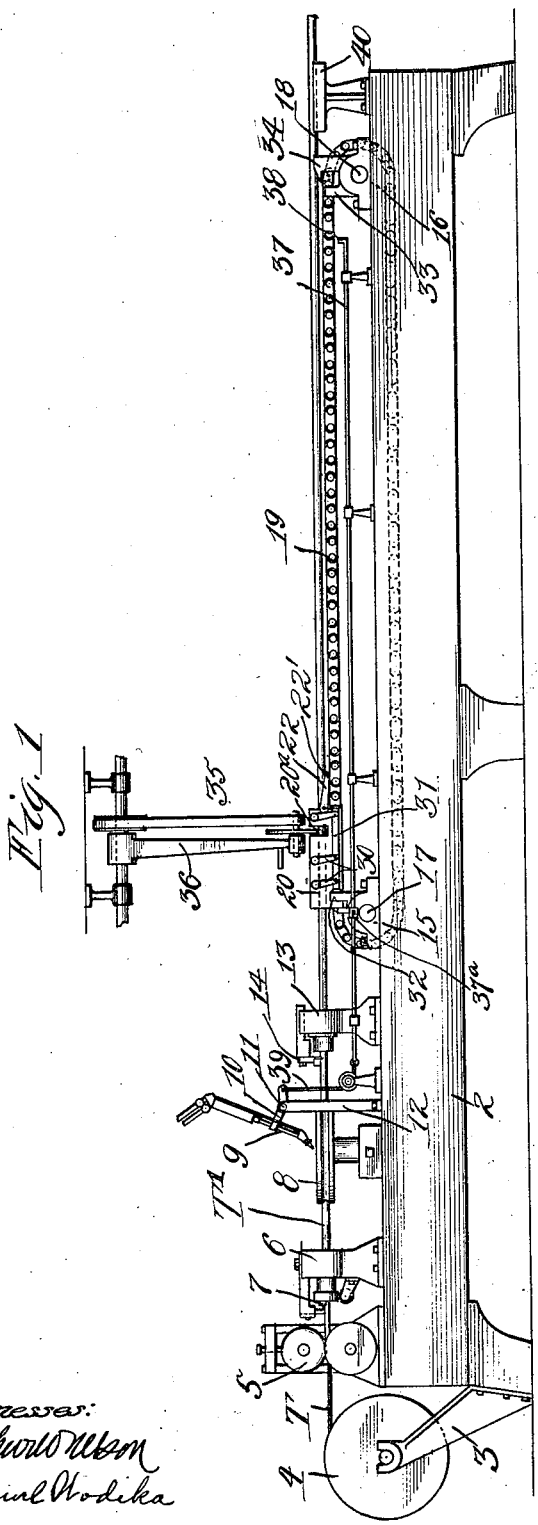

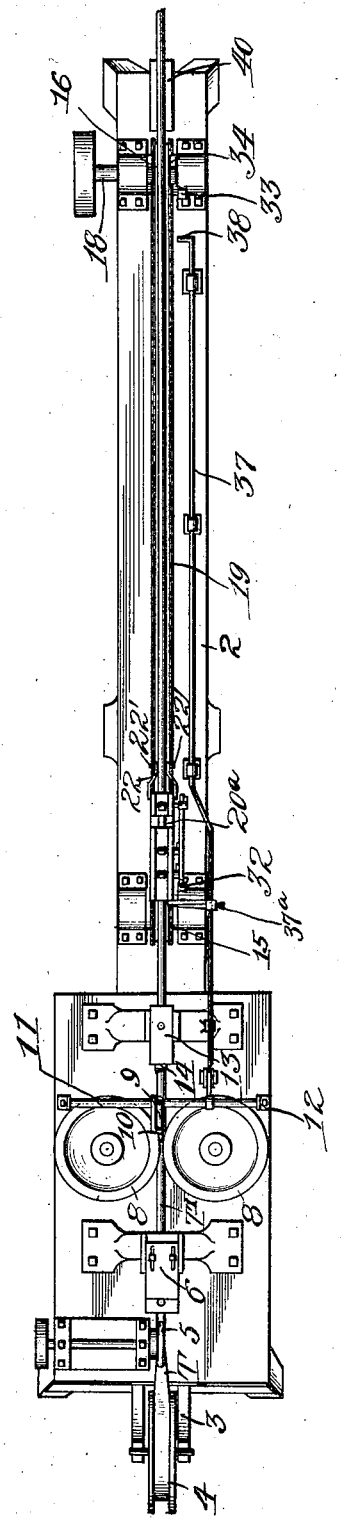

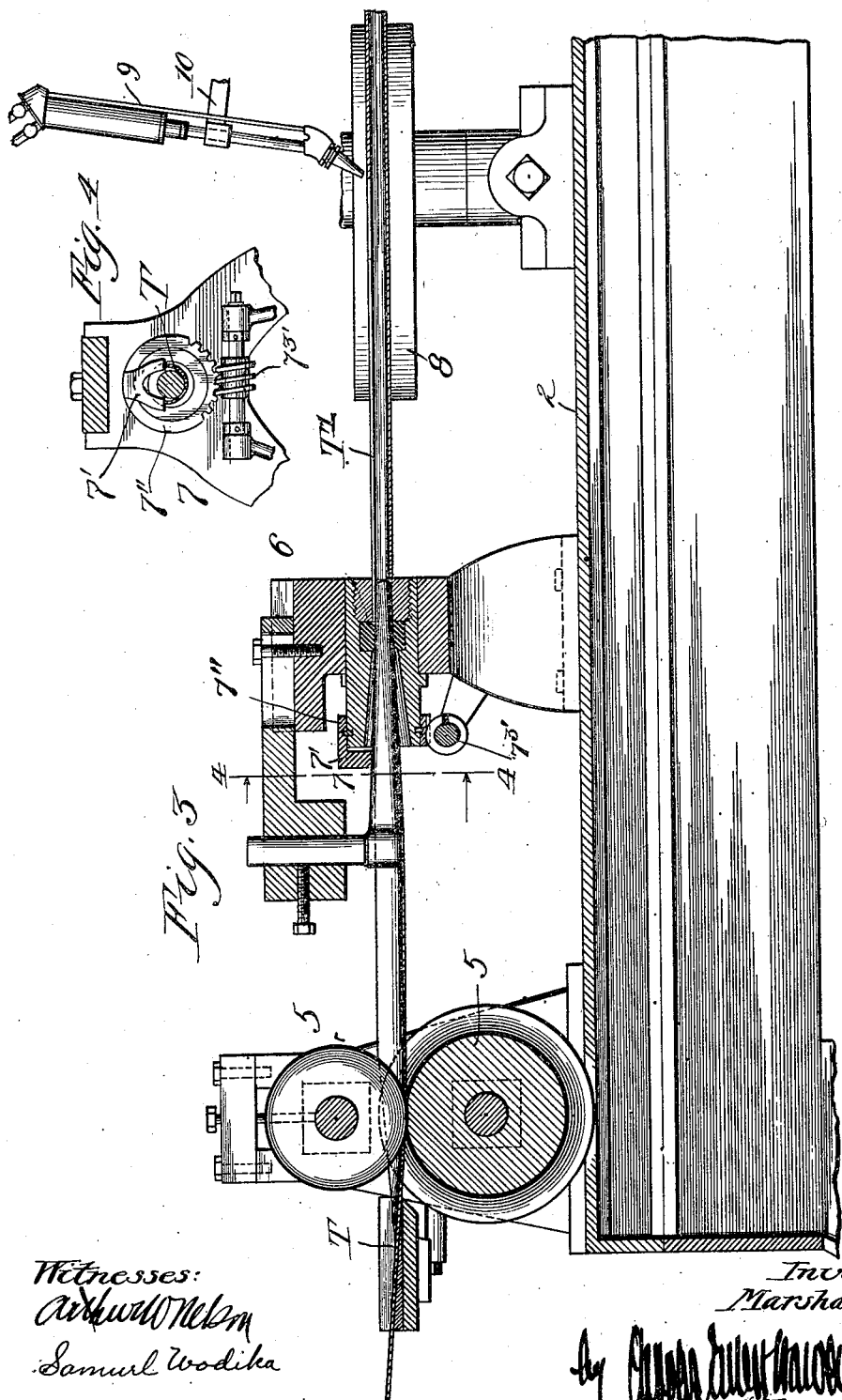

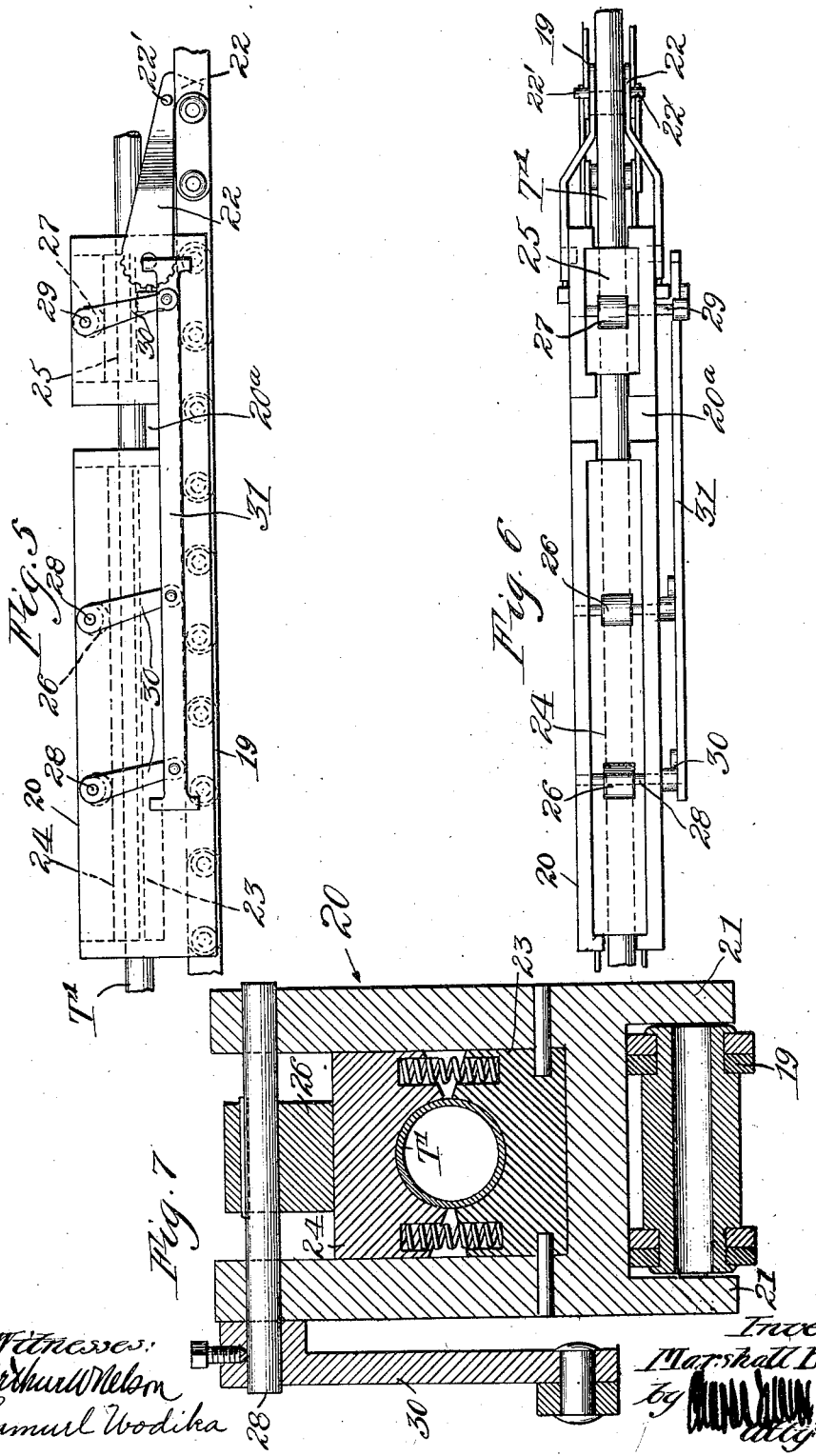

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

MACHINE FOR FORMING AND WELDING TUBING.

1,124,759.     Specification of Letters Patent.     Patented Jan. 12, 1915.

Application filed April 6, 1912. Serial No. 689,098.

*To all whom it may concern:*

Be it known that I, MARSHALL BURNS LLOYD, a citizen of the United States, and a resident of Menominee, Menominee county, Michigan, have invented a certain new, useful, and Improved Machine for Forming and Welding Tubing, of which the following is a specification.

My invention relates generally to machines for manufacturing tubing and has particular reference to an improved machine for successively forming and welding metal tubing.

The object of my invention is to provide a machine for producing metal tubing from a long strip of metal supplied from a reel or bundle; and a further object of the invention is to provide a machine which shall be adapted not only to form or draw the tubing but also to weld the seam thereof as rapidly as it is formed.

My invention consists primarily in a draw bench having a drawing head longitudinally movable and returnable in a straight line in combination with forming dies adapted to receive a strip of metal to be formed into a tube and through which dies the strip is drawn by said head and a welding mechanism interposed between said head and said dies and adapted to operate continuously upon the formed tubing throughout the positive or drawing movement of the head.

My invention also consists in various details of construction and in combination of parts, all as hereinafter described and more particularly pointed out in the claims.

The invention will be more readily understood by reference to the accompanying drawings in which I have shown a preferred form of my novel machine.

In these drawings, which form a part of this specification, Figure 1 is a side elevation of a machine embodying my invention for forming and welding metal tubes; Fig. 2 is a plan view thereof; Fig. 3 is a detailed view of the welding mechanism; Fig. 4 is an enlarged view disclosing the construction and operation of the seam positioning device which co-acts with the welding mechanism, and is taken on line 4—4 of Fig. 3; Fig. 5 is an enlarged side view of the draw bench head; Fig. 6 is a plan view thereof; and Fig. 7 is a section of the head.

In the drawings 2 represents a long frame or bed preferably elevated on legs and on which the several operating or moving parts of the machine are arranged. At one end of the frame is a standard 3 to contain the reel 4 from which the material T is taken. The material operated upon by this machine is usually hot rolled or cold rolled strip steel stock, its width being determined by the diameter of the tubing which is to be made. The opposite end of the frame 2 carries a mechanism for drawing the strip T from the reel. Between the drawing mechanism and the reel I arrange several devices which convert the flat strip into a tube and weld its seam, the movement imparted to the strip by the drawing mechanism causing these other parts of the machine to perform their several operations. At the end of the frame adjacent to the reel are the forming dies. Preferably these dies are of two kinds, the first set being rotary dies 5, adapted to make the initial bend in the strip T while the second die or dies 6 may be of a stationary or non-rotative type. Dies of this kind are in common use; therefore, their details do not require explicit description here. There is, however, one new and important element associated with the die 6 the operation of which must be understood, this being a seam positioning member 7 which is preferably mounted at the entrance of said final forming dies. In this die 6 the edges of the strip are forced together and a longitudinal seam is formed between the abutting edges. Proper operation of the welding mechanism is dependent upon the correct positioning of the seam of the tube in the welding mechanism and this is the office of the seam positioning device 7. The construction of this particular seam positioning device here shown is best disclosed in Fig. 4 and will be described in connection with the welding mechanism. On emerging from the final forming dies 6, the open seamed tube $T^1$ passes into the welding mechanism being received between a pair of horizontal grooved wheels or rolls 8, 8, which constitute the holding members of the welding mechanism. These rolls 8, 8 are so adjusted that while the tube may be easily drawn between them, they nevertheless effect sufficient pressure to firmly force the abutting seam edges of the tube together. The rolls 8, 8 do not make contact but stand apart and expose the seam of the tube. While the tube is in movement with the seam in this position I weld the seam edges together, using for the purpose an intensely hot gas flame. In practice I employ an oxy-acetylene torch 9, the flame from which is adequate to the welding of the seam edges as rapidly as fresh edges are presented to the flame. This torch 9 is carried by an arm 10 which is rotatable upon a cross rod 11 that is in turn supported by standards 12 which rise from the frame 2. Normally, the nozzle of the torch is close to the top of the tube, between the grooved rolls 8, 8, but it should occupy this position only when the tube is in movement. At other times I find it necessary to turn the torch back upon the rod 11 and thus remove the flame from the tubing. The means by which the torch is so operated will be explained hereinafter.

As intimated, the nozzle of the torch is so positioned as to direct its flame midway between the rolls 8, 8 and it is obvious that the seam of the tube will be welded if it is presented directly to the flame but will not be properly welded if the seam is permitted to drift or shift toward one or the other of the rolls 8, 8, for such displacement of the seam would remove it from the influence of the flame. It is necessary, therefore, to feed or direct the seam into the welder by positive means which will insure its proper position with respect to the torch. This is the office of the positioning device 7. Figs. 3 and 4 show this device as comprising a cross bar 7', the ends of which bear upon the upturned edges of the strip T, at the entrance to the die 6. The cross bar 7' is rigidly attached to a collar 7''. It is rotatable on the end of the die sleeve. It is held and may be adjusted by means of the worm gear 7³'. If the strip on emerging from the rotary die 5 has a tendency to creep laterally in either direction, the cross bar or positioner proper 7' is adjusted to arbitrarily fix the position of the strip, and counteract its tendency to twist. By adjusting the cross bar, the strip may be caused to emerge from the die 6 with its seam uppermost, directly above the axis of the tube. It follows that the seam will pass between the rolls and will lie in a vertical plane that bisects the flame.

13 represents a finishing or reducing die which I sometimes employ between the welding mechanism and the drawhead. This die may be of well known construction. When employing the die 13 I also use another part, namely, a knife 14 fixed on the die block 13 and adapted to cut or plane off the rough portions of the weld. The motive elements of the drawing mechanism are two large sprockets 15 and 16 mounted on shafts 17 and 18, which are widely separated on the frame 2. On the sprockets I arrange an endless chain or sprocket belt 19 of ordinary form. Movement is imparted to the endless chain by a motor (not shown) which is coupled to the shaft 18 at the forward end of the bench or frame. The belt may run continuously. The drawhead before referred to comprises a long block 20 having depending side flanges 21 which straddle the chain. At the forward end of the block is a hook 22 by which it may be attached to any of the links of the running chain. When the hook is dropped into engagement with the chain, the block, obviously, will be moved forward at the same speed as the chain. This block 20 contains two clamping bars 23 and 24 and one clamping block 25. These bars are fixed against endwise movement in the block and together the bars contain an opening to receive the tubing. The upper bar 24 and upper block 25 are movable vertically in the block 20 by means of cams 26 and 27. The cams are arranged on cross shafts 28 and 29 supported in the upper sides of the block 20. By rotating these shafts in one direction the clamping bar and block may be forced down upon the tubing to firmly clamp it upon the lower bar 23. While the clamping bars and blocks 23, 24 and 25 clamp the tubing firmly they spread the clamping action over a relatively large portion of the tube and thus prevent any crushing thereof. An operating arm or lever 30 depends from the end of each of the shafts 28, 28 and 29, and the lower ends of these bars are connected by a link 31. Movement of the link in one direction serves to clamp the tube and movement in the other direction frees the clamping members of the block from the tube. On the frame at points approximately above the shafts 17 and 18 are two stops 32 and 33. These lie in the path of the operating link 31. When the block is moved toward the shaft 17, the link 31 strikes the stop 32 and is held against further movement. The last part of the movement of the block 20 serves therefore to rotate the cams therein and thereby causes the clamping blocks to grip the tube. It will be understood that some portion of the tube is always within the clamps of the block and said clamps are in direct alinement with the projected axis of the several forming and shaping dies. When the block is moved forward, as by the chain belt, the link 31 finally strikes against the dog 33 with the result that the cam shafts of the block 20 are rotated in the opposite direction and release the tube. Just following the movement of the release of the tube, the block itself is released from the chain, this being brought about by a stationary wedge cam 34 which lies in the path of and engages a lug 22' that projects from the hook 22. When the lug rides upon the hook it is thereby forcibly withdrawn from the chain. It will be noted that the block 20 contains in its forward end a deep, transverse notch 20ª. This notch extends below the tube in the clamps and makes way for a transversely movable tube cutter 35. The tube cutter may comprise a rapidly rotated saw held in a swinging frame 36.

In the normal operation of the machine the block is shifted to the position shown in Fig. 1. The act of shifting it to this position causes it to clamp the tube as described. At such moment the hook 22 is out of engagement with the chain and before throwing the hook into engagement with the moving belt or chain, the operator grasps a handle on the swinging cutter and passes the saw through the notch 20ª in the block, thus severing the tube between the clamps 24 and 25. As soon as the hook is thrown down, the block begins to move forward and at this instant the torch is swung into position shown in Fig. 1 so that the flame impinges upon the seam of the tube between the rolls 8, 8. The forward movement of the block draws the metal through the forming rolls and the welding device, as explained. When once started the forming and welding operations continue uninterruptedly at the constant speed at which the block moves, until the block is freed from the tube through the action of the cam mechanism and the stationary stop 33. At this last moment the tube ceases to move and to the end that the operator may be relieved from the duty of throwing back the torch at this instant, I provide mechanism for doing it automatically. The same comprises a shifting rod 37 having an upturned end 38 in the path of the drawhead. The rod is drawn forward by the final movement of the drawhead and this movement of the draw rod 37 is communicated to the torch through a pull cord 39 which is attached to the lever end of the torch swinging arm 10. It follows that the torch is removed from the tubing at the instant that the tubing ceases to move by reason of its being released from the draw head. The frictional contact of the rod 37 with its bearings, and the weight of the rod serve to hold the torch up until it is moved back into position. For this purpose means 37ª are provided on the rod 37 which coöperate with the draw head at its starting position to move the rod 37 and thereby replace the torch into working position. By means of the mechanism herein described, successive lengths of tubing may be produced from a long strip of material, the draw head being moved back by hand upon the completion of each of its forward or active movements.

I have already pointed out the block 25 as retaining its hold upon the end of the tubing after the tubing is cut, and it should also be understood that the clamp 25 does not release the tubing until the head reaches the forward end of the draw bench. The head, therefore, operates to expel successively severed ends of the tubing through a guide or rest 40 positioned at the end of the frame 2.

As various modifications of my invention will readily suggest themselves to one skilled in the art, I do not limit or confine the invention to the specific structure herein shown and described, except as required by express limitations in the claims hereunto appended.

It may be remarked that the machine herein described and claimed may be employed to carry out certain improvements in the art of manufacturing metal tubing which are described and claimed in my copending application Serial Number 638,202, filed July 12, 1911.

Having thus described my invention I claim as new and desire to secure by Letters Patent:

1. A tube making machine comprising a draw bench having a draw head adapted for load-pulling operation in one direction, and free operation in the other direction, in combination with forming dies arranged at the receiving end of the bench, and welding mechanism interposed between the forming dies and the draw bench, said draw bench being formed to grip the tubing at any portion and permit the end of the tubing to project therethrough, and to draw the material through the said dies and mechanism.

2. A machine for forming and welding successive lengths of tubing from a substantially continuous strip of metal comprising in combination a reel support, forming dies, a welding mechanism and a draw bench arranged in the order named, said bench having a movable head adapted to grip the tubing at any point and to draw the material from the reel and through said dies and welding mechanism.

3. In a device of the class described the combination of tube drawing mechanism and welding burner with automatic means controllable by the said drawing mechanism to swing the burner into and out of the welding position as the said drawing mechanism starts and stops respectively.

4. A tube forming and welding machine comprising in the following order a reel support for supplying a continuous strip of metal, a die adapted to receive the strip and partially form same into a tube, an edge engaging device adapted to guide the seam forming edges in an unvarying path, a finishing die, a device for forcing the said edges closely together, a burner positioned to deliver a welding flame upon the seam at the point where it passes through the said edge holding device, means for intermittently drawing the tube forward from the members heretofore enumerated, and means operable when the tube is at rest to cut off finished sections therefrom in commercial lengths.

5. In a tube forming and welding machine, the combination of means for forming and welding the tube with means adapted to intermittently draw the tube forward, said means being operatively connected to control the operation of the welding device in accordance with the starting and stopping of the tube drawing mechanism.

6. In a device of the class described, the combination of tube-forming and welding means with reciprocable means for intermittently drawing the tube forward, said means being operatively connected to permit the welding means to remain in operation while the tube is moving forward, to move the torch out of welding position just prior to the time the tube is stopped, and to return the torch to welding position as the tube is started.

7. In a tube forming and welding machine the combination of means for forming and welding the tube, with means formed and adapted to grip the tubing at any point and to intermittently draw the tube forward.

8. In a device of the class described intermittent drawing means comprising a reciprocable draw-head for gripping the tube and mechanism for moving same forward, in combination with forming and welding means, said draw-head being adapted to distribute its tube engaging contact to avoid crushing the tube.

9. In a tube drawing machine to combination of means for forming the tube with means adapted to draw the tube forward, said drawing means comprising a relatively long draw head adapted securely to grip the tube lengthwise therein to avoid crushing the tube, continuously movable belt means arranged to move substantially into alinement with and away from the forming means, a dog on said head adapted to engage said belt to draw the head forward, said dog being automatically detachable from the belt when the end of its forward movement is reached.

10. In a tube forming machine means for forming a continuous strip metal into a tube in combination with a continuously movable belt and a reciprocable draw head adapted to engage the tube as it emerges from the forming means, said draw head being adapted to engage said moving belt for drawing the tube forward and disengage from said belt at the end of its forward travel, automatic means for closing the head on the tube when drawn back for the next forward movement, and automatic means to open said head to release the tube when the head has moved forward to the end of its travel.

11. In a device of the class described, the combination of tube forming and welding means with a reciprocable draw-head for intermittently drawing the tube forward and welding control means located at each end of travel of said draw head and operatively connected to throw the welding means into operation when the head is returned to its initial position and to throw said welding means out of operation when the head reaches the end of its travel.

12. In a tube forming and welding machine, the combination of means for forming and welding the tube with reciprocable means adapted to grip the forward end of the tube to draw it intermittently forward, said drawing means being operatively connected to control the operation of the welding device in accordance with the starting and stopping of the forward movement of tube drawing mechanism.

In testimony whereof, I have hereunto set my hand this 11th day of March, 1912, in the presence of two subscribing witnesses.

MARSHALL BURNS LLOYD.

Witnesses:
HILDA C. PETERSON,
CHARLES GILBERT HAWLEY.